June 5, 1923.

S. KURTZ 1,457,580

SEWER TRAP VALVE

Filed Jan. 12, 1922

STANLEY KURTZ INVENTOR.

BY Richey Slough + Files

His ATTORNEY'S

June 5, 1923.

S. KURTZ 1,457,580

SEWER TRAP VALVE

Filed Jan. 12, 1922

STANLEY KURTZ  INVENTOR.

BY Richey Slough + Tales his ATTORNEYS

Patented June 5, 1923.

1,457,580

UNITED STATES PATENT OFFICE.

STANLEY KURTZ, OF LORAIN, OHIO.

SEWER-TRAP VALVE.

Application filed January 12, 1922. Serial No. 528,599.

*To all whom it may concern:*

Be it known that I, STANLEY KURTZ, a citizen of the United States, residing at Lorain, in the county of Lorain and State of Ohio, have invented certain new and useful Improvements in Sewer-Trap Valves, of which the following is a full, clear, and concise description, as will enable others skilled in the art to which my invention appertains to make and use the same.

My invention relates to sewer trap valves and more particularly to such valves as are used in connection with drain traps for sewer pipes.

It is a particular object of my invention to provide a valve of the general character mentioned which is so constructed as to effectively prevent the back-flow of sewage, operative whenever the water or sewage rises in the sewer pipe to which my valve is attached.

Another object of my invention is to provide a cage on the sewer side of the operating element of my valve so as to prevent clogging of the valve mechanism by trash.

Another object of my invention is to provide such a valve mechanism which may have its operating parts removed as a unit so as to provide a large opening through which access may be had to the interior of the sewer pipe for cleaning the same.

Other objects of my invention and the invention itself will be made clear by reference to the following description of my invention, and the drawings forming a part thereof. Referring to the drawings—

Figure 2:
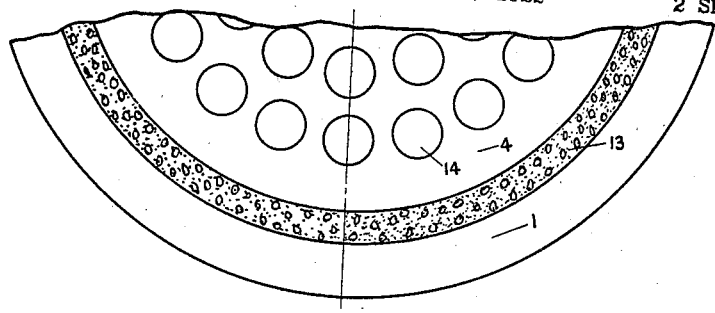
Fig. 2 shows a partial plan view looking from above of the embodiment of my invention illustrated in Fig. 1.
Figure 1:
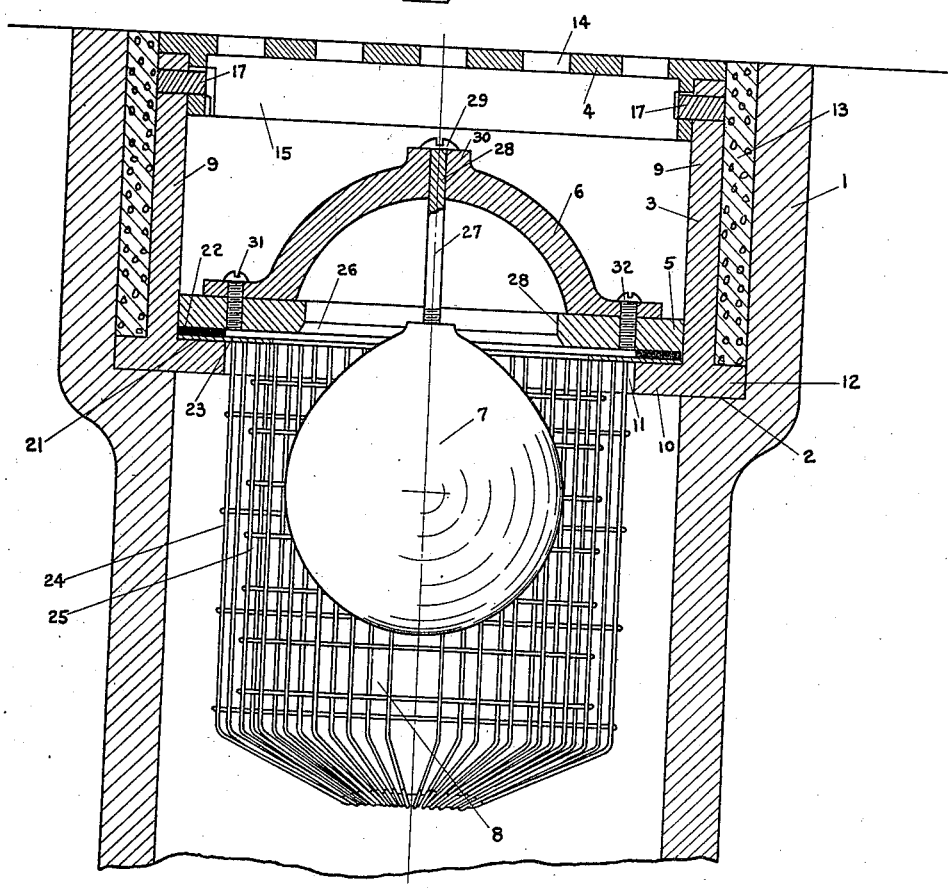
Fig. 1 shows a vertical cross-sectional view of an embodiment of my invention, except that the float ball valve member is herein shown in side elevation.

Referring now to all of the figures in which like parts are designated by like reference characters, at 1 I show the upper end of a sewer pipe which is provided with the usual annular internal shoulder 2 near the end of the pipe, and upon which shoulder the sewer trap valve apparatus of my invention is adapted to rest.

This apparatus comprises a basin member 3, a perforated cover therefor 4, an annular valve seat ring 5, a valve ball supporting bridge 6, a valve ball 7 together with a projecting cage or guard 8, and various means for securing the above parts together in operative relation, to each other.

The basin member 3 comprises side walls 9 and a bottom wall 10, the said bottom wall extending inwardly, however, only a short distance, having a relatively large central opening 11. The basin 3 also preferably has an external bead 12 on its lower-most portion adapted to rest on the shoulder 2 of the pipe 1.

The space 13 between the basin side walls 9 and the sewer pipe 1 is filled by cement or other filling material. The cover 4 has a plurality of perforations 14, and an annular depending ring flange portion 15, such portions having bayonet joint notches 16 on opposite sides whereby the cover may be put into place and rotated slightly to latch the cover to basin walls 9 by means of latch pins 17 projecting inwardly from the side walls of the basin.

An annular ring valve seat member 5 is insertable into the basin 3 when the cover 4 is removed, this being capable of being done since the ring member 5 has a notched portion 18, the notches of which are adapted to permit the ring to clear the pin 17 as the ring is inserted into the basin, also the notched portions 18 having inclined extensions 19 communicating therewith are adapted to receive pins 20 extending inwardly from the side walls 9 of the basin 3 just as do the similar pins 17 for the cover securing means, and the annular ring 5 is rotated to a position where the notches 18 embrace the pins 20 and allow the ring 5 to come to rest upon the seat 21 formed by the bottom 10 of the basin, except for the intervening gasket 22 and guard supporting ring 23 hereinafter described.

Figure 3:
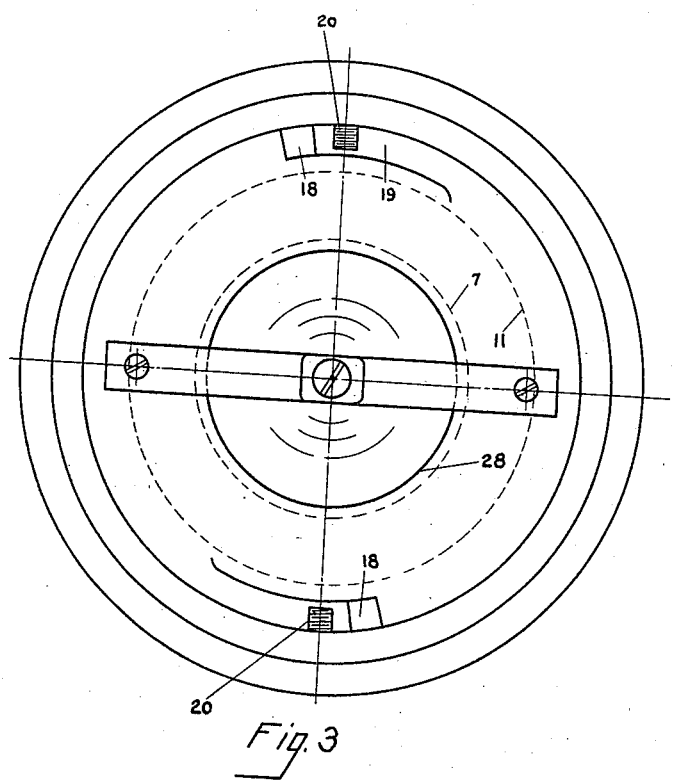
Fig. 3 shows a top plan view of the embodiment illustrated in Fig. 1 with the cover plate removed so as to expose some of the inner parts.
Figure 4:
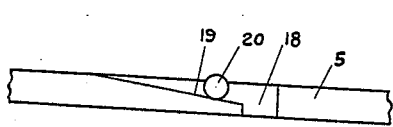
Fig. 4 shows a side elevational view of a portion of the annular ring valve seat member to illustrate the securing means therefor.
Figure 5:
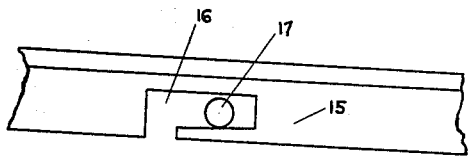
Fig. 5 shows a similar side elevational view of the securing means portion of the cover member.

The pins 20 for the annular ring securing means are disposed on opposite sides of the basin and at right angles to the sides of the basin where the pin 17 for the cover securing means are placed. In Figs. 4 and 5, the pins 20 and 17 are indicated to show the position thereof within the openings provided for them on the members 5 and 15 respectively when the ring and cover are secured tightly in place on the basin. Fig. 3 shows a plan view of the ring securing means comprising the pins 20 and the notch 18 with the inclined portion 19 in ring securing positions. The pins 17 and 20 are preferably screw threaded so as to facilitate securing them tightly in the walls 9 of the basin 3.

In this way I have provided means whereby both the cover 4 and the annular ring 5, which carries all of the working parts of the valve, are adapted to be put into place by a simple slight rotational action and removed in the same way. The guard cage 8 is preferably constructed as illustrated of wires and preferably comprises an outer cage 24 and an inner cage 25, the outer cage having larger openings as for instance three-quarter inch openings, and the inner cage having openings perhaps three-eighths inch, although these dimensions may be varied considerably. I find that a double cage operates more efficiently than a single cage to prevent trash from getting to the valve seat 26 and between the said valve seat and the valve ball 7 to prevent the valve ball from floating upwardly to close the valve comprising the seat and the surface of the ball. The ball 7 is supported on a rod 27 which is journaled at 28 loosely so that it may reciprocate in the said journal to permit the valve to open and close the central opening 28 of the annular ring 5. The rod 27 has an enlarged head 29 adapted to rest normally on the top surface 30 of the bridge member 6. The bridge member 6 is secured by machine screws 31 and 32 to the annular ring 5 so that when the annular ring 5 is removed as for inspection or cleaning of the parts, the bridge, together with the ball 7, can be removed together, permitting the removal lastly of the double cage 8.

The cage supporting ring 23 and the gasket 22 are put into place in assembling the apparatus of my invention before the ring 5 and preferably in the order mentioned, the gasket 22 being of slightly compressible material so as to make a tight joint to prevent the egress of liquid at the sides of the ring 5.

When the internal operative parts are removed, it will be seen that an opening 11 in the bottom of the basin 3 is presented for the workman to easily secure access to the interior of the sewer pipe for cleaning purposes.

Having thus described my invention in a specific embodiment, it will be understood that numerous and extensive departures may be made from the embodiment herein illustrated and described but without departing from the spirit of my invention.

I claim:

1. In a back-flow check valve for sewers and the like, the combination with a tubular basin member, said tubular member having outwardly and inwardly extending flanges on its lower end, an annular ring loosely fitting within the said tubular member, clamping projections extending from the side walls inwardly from the said tubular member, said annular ring being adapted to be clamped between the said inwardly extending flange and said projection, a bridge member spanning and mounted upon the said ring, a ball float, a rod secured to one end thereof and extending therefrom, a valve seat on the lower inner edge of said ring, a journal at the middle point extending vertically in said bridge, said rod being vertically slidable in said journal whereby said ball float may rise to engage the said seat to close the valve.

2. In a sewer trap valve mechanism a basin member having cylindrical side walls and a bottom wall, said bottom wall having a large central opening, a removable perforated cover for the basin, an annular ring of substantially the same diameter as the internal diameter of the basin and insertable therein and adapted to be clamped against the inner surface of the said basin bottom wall, a valve seat on the said annular member, said valve seat being disposed within the said bottom wall opening and above the same, a yoke spanning and mounted on said annular member, a ball float valve for the said seat, and a valve stem projecting from the valve and slidably mounted in said yoke and having an enlarged head at its upper end whereby said ball float valve member may be reciprocated upwardly and downwardly to close and open the valve, and a perforated cage having an upper outwardly extending ring flange, said flange being clamped between the said ring and the said bottom wall.

3. In a back-flow check valve for sewers and the like, the combination with a tubular basin member, said tubular member having outwardly and inwardly extending flanges on its lower end, an annular ring loosely fitting within the said tubular member, clamping projections extending from the side walls inwardly from the said tubular member, said annular ring being adapted to be clamped between the said inwardly extending flange and said projection, a bridge member spanning and mounted upon the said ring, a ball float, a rod secured to one end thereof and extending therefrom, a valve seat on the lower inner edge of said ring, a journal at the middle point extending vertically in said bridge, said rod being vertically slidable in said journal whereby said ball float may rise to engage the said seat to close the valve, and a wire cage guard disposed about the said ball float and having an upper outwardly extending flange supporting portion, said flange supporting portion being adapted to be clamped between the said ring and the said inwardly extending basin flange.

4. In a sewer trap valve mechanism a basin member having cylindrical side walls and a bottom wall, said bottom wall having a large central opening, a removable perforated cover for the basin, an annular ring of substantially the same diameter as the internal diameter of the basin and insertable therein and adapted to be clamped against the inner surface of the said basin bottom wall, a valve seat on the said annular member, said valve seat being disposed within the said bottom wall opening and above the same, a yoke spanning and mounted on said annular member, a ball float valve for the said seat, and a valve stem projecting from the valve and slidably mounted in said yoke and having an enlarged head at its upper end whereby said ball float valve member may be reciprocated upwardly and downwardly to close and open the valve, and a perforated cage having an upper outwardly extending ring flange, said flange being clamped between the said ring and the said bottom wall, said cage comprising outer and inner perforated walls, the openings in the said outer wall being larger than those of the said inner wall.

5. In a back-flow check valve for sewers and the like, the combination with a tubular basin member, said tubular member having outwardly and inwardly extending flanges on its lower end, an annular ring loosely fitting within the said tubular member, clamping projections extending from the side walls inwardly from the said tubular member, said annular ring being adapted to be clamped between the said inwardly extending flange and said projection, a bridge member spanning and mounted upon the said ring, a ball float, a rod secured to one end thereof and extending therefrom, a valve seat on the lower inner edge of said ring, a journal at the middle point extending vertically in said bridge, said rod being vertically slidable in said journal whereby said ball float may rise to engage the said seat to close the valve, and a wire cage guard having a plurality of perforated walls disposed about the said ball float and having an upper outwardly extending flange supporting portion, said flange supporting portion being adapted to be clamped between the said ring and the said inwardly extending basin flange.

6. In a back-flow check valve for sewers and the like, the combination with a tubular basin member, said tubular member having outwardly and inwardly extending flanges on its lower end, an annular ring loosely fitting within the said tubular member, clamping projections extending from the side walls inwardly from the said tubular member, said annular ring being adapted to be clamped between the said inwardly extending flange and said projection, a bridge member spanning and mounted upon the said ring, a ball float, a rod secured to one end thereof and extending therefrom, a valve seat on the lower inner edge of said ring, a journal at the middle point extending vertically in said bridge, said rod being vertically slidable in said journal whereby said ball float may rise to engage the said seat to close the valve, and a wire cage guard having a plurality of perforated walls disposed about the said ball float and having an upper outwardly extending flange supporting portion, said flange supporting portion being adapted to be clamped between the said ring and the said inwardly extending basin flange, said annular ring, and said rod and ball float being removable as a unit by a slight rotational turning to disable the clamping means.

7. In a back-flow check valve for sewers and the like, the combination with a tubular basin member, said tubular member having outwardly and inwardly extending flanges on its lower end, an annular ring loosely fitting within the said tubular member, clamping projections extending from the side walls inwardly from the said tubular member, said annular ring being adapted to be clamped between the said inwardly extending flange and said projection, a bridge member spanning and mounted upon the said ring, a ball float, a rod secured to one end thereof and extending therefrom, a valve seat on the lower inner edge of said ring, a journal at the middle point extending vertically in said bridge, said rod being vertically slidable in said journal whereby said ball float may rise to engage the said seat to close the valve, and a wire cage guard disposed about the said ball float and having an upper outwardly extending flange supporting portion, said flange supporting portion being adapted to be clamped between the said ring and the said inwardly extending basin flange, said guard comprising outer and inner perforated walls, said annular ring and said rod and ball float being removable as a unit by a slight rotational turning to disable the clamping means, said guard being removable as a unit after the removal of the said ring and ring supported apparatus.

In witness whereof, I have hereunto signed my name this 10th day of January, 1922.

STANLEY KURTZ.